June 30, 1953 — W. H. NEELY — 2,643,705
WIRE SPRING STRUCTURE
Filed April 15, 1948 — 3 Sheets-Sheet 1

INVENTOR.
WILLIAM H. NEELY
BY
Gustav A. Wopp
ATT.

June 30, 1953  W. H. NEELY  2,643,705
WIRE SPRING STRUCTURE
Filed April 15, 1948  3 Sheets-Sheet 2

INVENTOR.
WILLIAM H. NEELY
BY
Gustav A. Wolf
ATT.

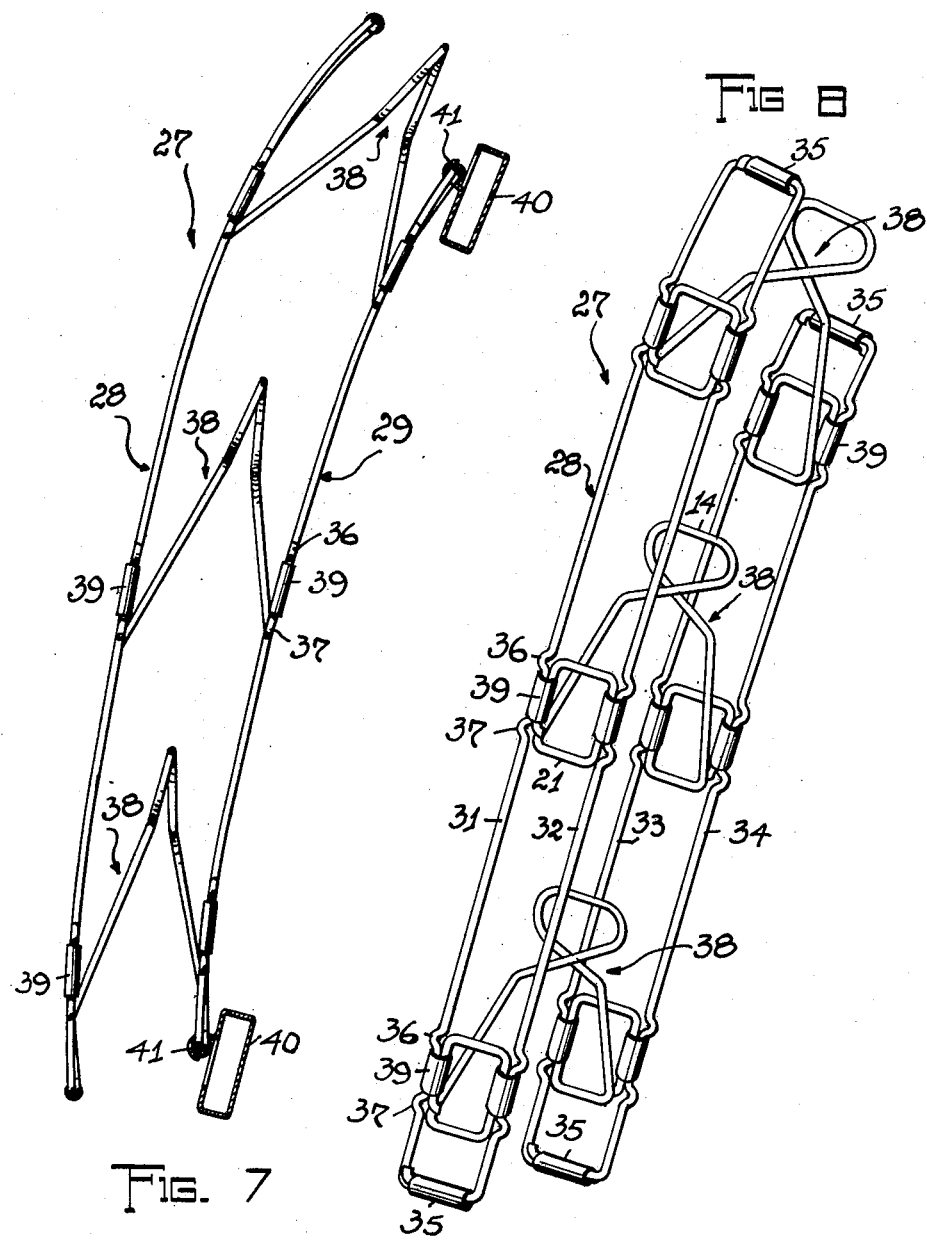

Patented June 30, 1953

2,643,705

UNITED STATES PATENT OFFICE 2,643,705

WIRE SPRING STRUCTURE

William H. Neely, Cleveland, Ohio, assignor to The Universal Wire Spring Company, Cleveland, Ohio, a corporation of Ohio Application April 15, 1948, Serial No. 21,141

3 Claims. (Cl. 155—179)

This invention relates to improvements in upholstered seat and back spring constructions and has particularly reference to spring constructions for upholstered seats for vehicles and furniture. Such spring constructions should be soft and yielding and, particularly when used in vehicles such as automobiles, railroads, etc., should be light in weight, economical in manufacture, of minimum thickness, and of sufficient resistance to extreme deflection and, finally, should give the feel of considerable depth.

The principal object of this invention is the provision of a spring structure for upholstered spring constructions in which elongated, yielding wire members, arranged above each other in substantial parallel relation, are yieldingly spaced from each other by V-shaped spacing members interposed between the wire members and rigidly attached thereto, and in which the V-shaped wire members include arms with portions angularly related to each other to effect contact between these arms and a change of their active length when the spring structure is loaded with a predetermined load.

Another object of the invention is the provision of a spring structure for upholstered spring constructions in which elongated, sinuously corrugated wire members, arranged above each other in substantial parallel relation, are yieldingly coupled with each other by V-shaped wire spacing members interposed between the wire members and secured thereto, and in which each wire spacing member is formed of straight wire bent to include a laterally extended, sharp-edged apex formed by a straight wire portion, and arms with laterally, angularly related portions extended from the straight wire portion, the straight wire portion torsionally counteracting load stresses on the spacing members, and the angularly related portions of the arms effecting contact of the arms with each other and a decrease in their active length when the spring structure is loaded with a predetermined load.

A further object of the invention is the provision of a spring structure for upholstered spring constructions in which elongated, sinuously corrugated wire members, arranged above each other in substantial parallel relation, are yieldingly coupled with each other by V-shaped wire spacing members interposed between the wire members and rigidly attached thereto, and in which each of the V-shaped wire spacing members includes a sharp-edged apex formed by a straight wire portion and oppositely inclined straight wire arms extended from loops at the ends of the straight wire portion in lateral angular relation with respect to each other, to effect contact between the arms and a change in their active length when the spring structure is loaded with a predetermined load.

Still another object of the invention is the provision of a spring structure for upholstered spring constructions in which elongated, sinuously corrugated wire members, arranged above each other in substantial parallel relation, are yieldingly coupled with each other by V-shaped wire spacing members interposed between the wire members and rigidly attached thereto, and in which each of the V-shaped wire spacing members includes a sharp-edged apex formed by a straight wire portion and oppositely inclined straight wire arms extended from loops at the ends of the straight wire portion in lateral, angular relation with respect to each other, said arms being laterally, angularly related to each other to effect contact therebetween and reduce the active length of the arms when the spring structure is loaded with a predetermined load, said arms being vertically bent in the area of their contact under predetermined loads to provide shortened, diverging arm portions when the arms contact each other and permit additional yield of the spacing members at increased loads.

Additional objects and novel features of construction, combinations and relations of parts by which the objects in view have been attained, will appear and are set forth in detail in the course of the following specification.

The drawings accompanying and forming part of the specification illustrate certain practical embodiments of the invention, but it will be apparent as the specification proceeds that the structure may be modified and changed in various ways without departure from the true spirit and scope of the invention.

In the drawings:

Fig. 7 is a sectional view through a frame mounting a spring construction with somewhat modified spring structures including spacing and supporting members such as shown in Fig. 6; and Fig. 8 is a perspective view of a spring structure such as shown in Fig. 7.

Figures 1, 2:
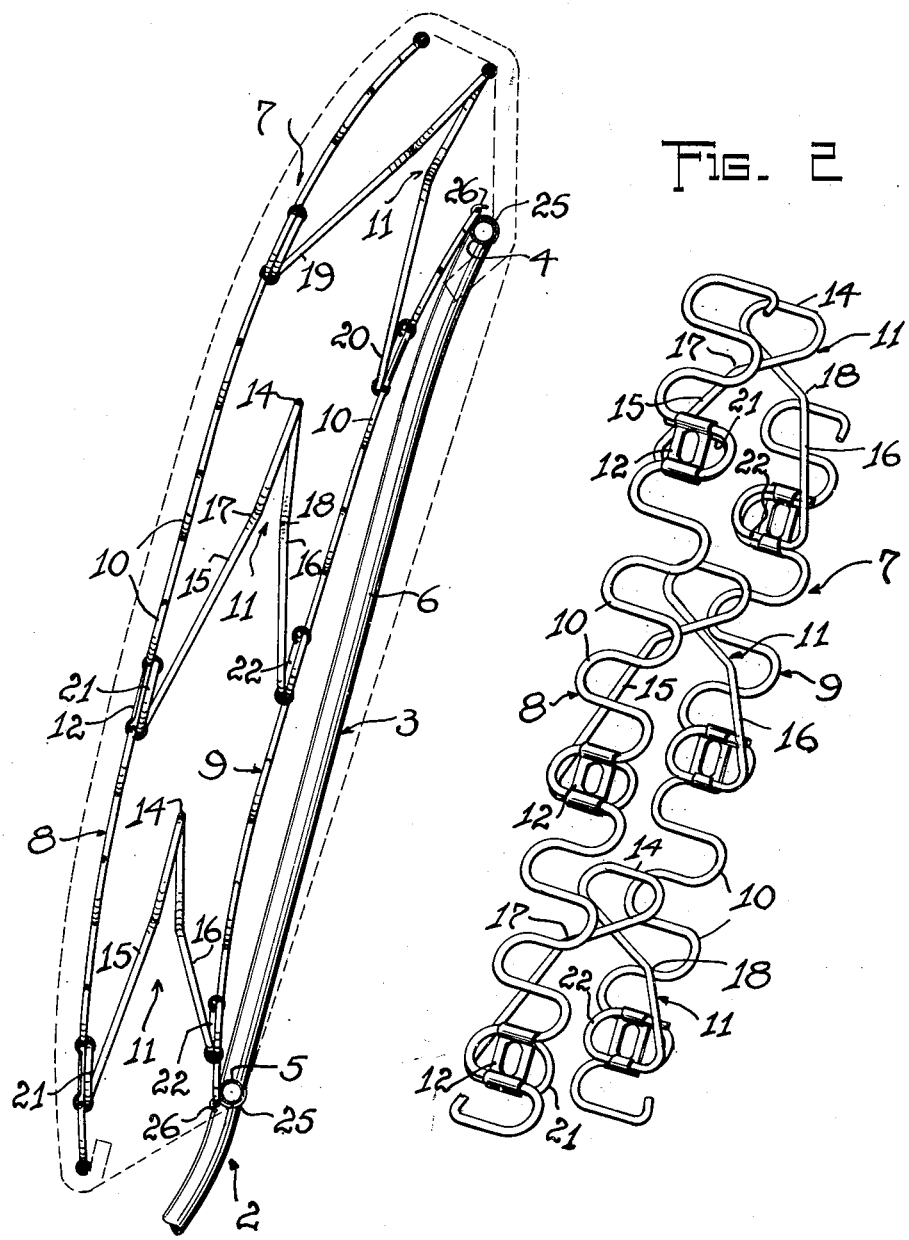
Fig. 1 is a sectional view through a tubular frame mounting a spring construction embodying spring structures made in accordance with this invention.
Fig. 2 is a perspective view of a spring structure such as shown in Fig. 1.

Referring now in detail to the exemplified form of the seat structure shown in Figs. 1 through 5, reference numeral 2 represents a sectionally and fragmentarily shown seat frame structure of an automobile, the back frame 3 of which has substantially rectangularly shaped open form. Back frame 3 is made of steel tubing and includes a top rail 4, a bottom rail 5 and side rails 6. The top and bottom rails 4 and 5 support a plurality of elongated, corrugated wire spring structures 7 which bridge the back frame and are attached to its top and bottom rails in a manner later to be described.

The elongated, corrugated wire spring structures 7 each include spaced corrugated top and base wire members 8 and 9 made of steel wire bent to sinuous shape so that their loops 10 extend substantially parallel to each other. These top and base wire members, of which top wire member 8 is somewhat longer than base wire member 9, are connected to each other in substantially parallel relation by V-shaped wire spacing members 11 which are rigidly secured to members 8 and 9 by sheet metal clips 12. The V-shaped wire spacing members extend between the spaced top and base wire members 8 and 9 and are formed from straight wire bent to V-shape in such a fashion that each spacing member includes a sharp-edged apex 14 and diverging arms 15 and 16 laterally, angularly related to each other to contact each other in a predetermined area when these spacing members are compressed under predetermined loads applied to the top wire member 8 of a wire structure. Arms 15 and 16 additionally include bends 17 and 18 arranged in the area of contact of these arms when the spacing members are compressed under predetermined loads and have their end portions 19 and 20 formed with open ended loops 21 and 22 angularly related to said end portions to permit proper contact of the open ended loops with the loops 10 of top and bottom members 8 and 9 attached to said arms by sheet metal clips 12.

Figure 3:
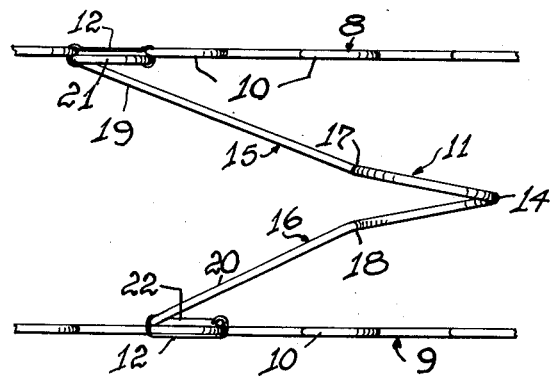
Fig. 3 is a fragmentary side view of the spring structure showing same in unloaded condition and, Fig. 4 is a fragmentary side view of the spring structure showing same in condition of being loaded to a predetermined value.
Figure 4:
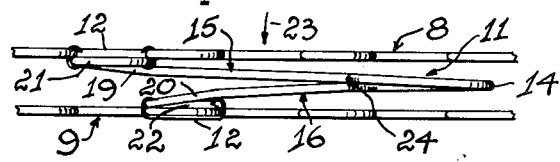
Figure 5:
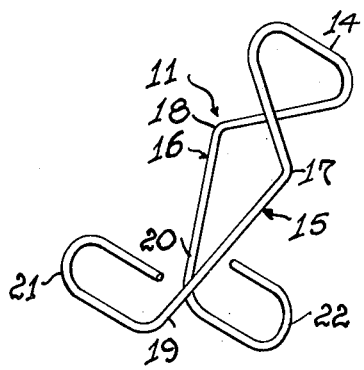
Fig. 5 is an enlarged perspective view of the V-shaped spacing and supporting member.

The action of the thus constructed wire spring structure will best be understood from inspection of Figs. 3 and 4 showing the spring structure in unloaded condition and loaded with a predetermined load to effect contact between the arms of a spacing member. These figures disclose that in loaded condition the active length of the arms of the spacing member extends from its apex to its end loops and in loaded condition, when loaded with a predetermined load as indicated by arrow 23, the active length of the arms extends from the contact area 24 of the arms to their end loops. Fig. 4, furthermore, discloses that due to bends 17 and 18 in arms 15 and 16 additional load can be carried by the spacing members which under these conditions have increased their resistance against compression proportionate to the decrease in length of arms 15 and 16.

Wire spring structures 7 which as stated above, are attached to back frame 3 have their base wire members 9 horizontally secured to the top and bottoms rails 4 and 5 of said back frame. For such purpose these top and bottom rails have secured thereto hook-shaped bracket members 25 preferably welded thereto in such a manner that base wire member 9 is longitudinally stretched when secured to the hook portions 26 of members 25 and is seated against the rails to bulge outwardly and stiffen the base member, all for the purpose of increasing its resistance against inward bulging when pressure is exerted on the top wire member of the spring structure.

Figure 6:
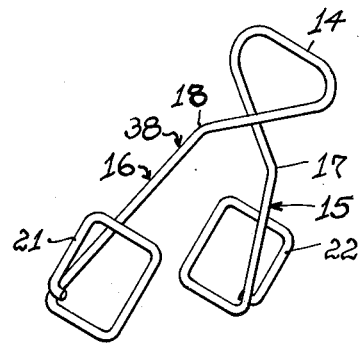
Fig. 6 is an enlarged perspective view of a somewhat modified V-shaped spacing and supporting member.

The wire spring structure 27 shown in Figs. 6 through 8 discloses a somewhat modified form of the invention. In this case the top and base members 28 and 29 of the spring structure embody two parallel, straight wire elements 31, 32 and 33, 34 respectively, secured to each other at their ends by clips 35 and formed between their ends with spaced, aligned bumps 36, 37 to non-shiftably attach to said top and bottom members a plurality of spacing members 38 secured thereto by clips 39 and shaped and constructed similar to the previously described spacing members 11. A thus constructed spring structure which is axially non-stretchable is secured to the rails of a frame 40 by bending stuck-up portions 41 of the frame around the end clips 35 as will readily be understood from inspection of Fig. 7.

Having thus described my invention what I claim is:

1. In a wire spring structure axially spaced, elongated, zig-zag shaped wire strips and V-shaped integrally formed wire members arranged between said wire strips for spacing same, each of said wire members including a V-shaped middle portion formed by two laterally spaced, cooperating loop portions and providing the V-shaped wire member with a sharp-edged apex positioned in symmetrical, angular relation midway between the ends of the wire member, straight wire arm portions integrally extended from the cooperating loop portions of said middle portion and loop portions integrally extended from the ends of said wire arm portions in angular relation with respect thereto to permit proper engagement of such loop portions with the said zig-zag shaped wire strips.

2. A wire spring structure as described in claim 1, wherein the said straight wire arm portions are shaped to laterally incline toward each other, and wherein said end loop portions laterally extend from said wire arm portions in symmetrical, substantial parallel relation toward each other.

3. In a wire spring structure, spaced, elongated zig-zag shaped wire strips and V-shaped, integrally formed wire members arranged between said wire strips and secured thereto, each of said V-shaped wire members including a V-shaped middle portion embodying two spaced, symmetrically arranged loop portions extended in angularly related planes with respect to each other, straight wire arm portions integrally extended from symmetrically arranged ends of said loop portions and laterally inclined with respect to each other, said straight wire arm portions having lateral and vertical bends arranged to locate portions of said wire arm portions above each other to effect a decrease in the active length of the wire arm portions when the wire spring structure is partly compressed by a predetermined load.

WILLIAM H. NEELY.

References Cited in the file of this patent

UNITED STATES PATENTS

| Number | Name | Date |
|---|---|---|
| 2,233,545 | Menge | Mar. 4, 1941 |
| 2,363,351 | Neely | Nov. 21, 1944 |
| 2,384,191 | Neely | Sept. 4, 1945 |
| 2,440,001 | Blumensaadt | Apr. 20, 1948 |
| 2,462,539 | Neely et al. | Feb. 22, 1949 |